No. 894,533. PATENTED JULY 28, 1908.
H. G. REIST.
DYNAMO ELECTRIC MACHINE.
APPLICATION FILED NOV. 11, 1907.
2 SHEETS—SHEET 2.
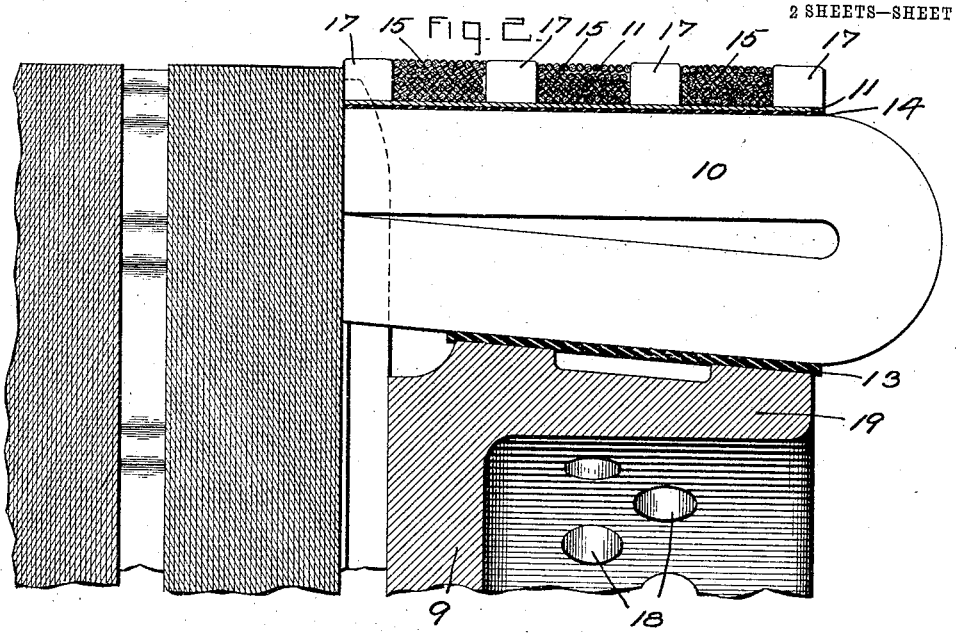
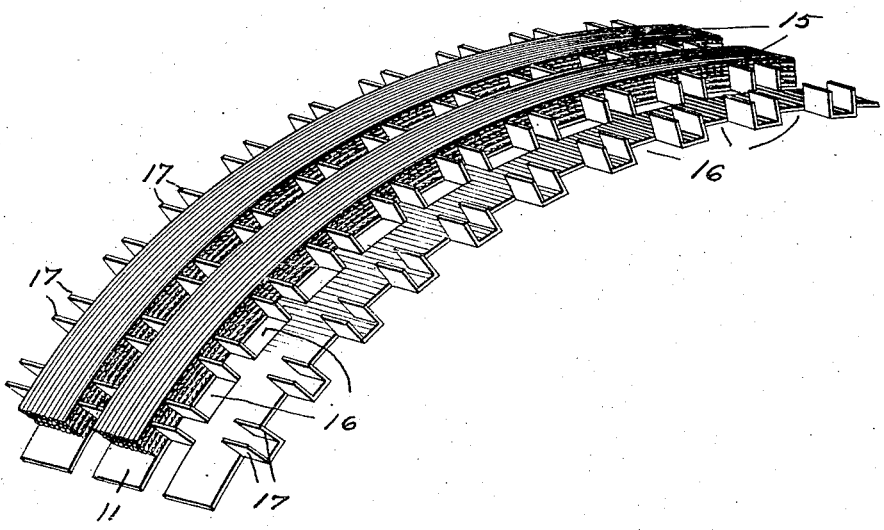
WITNESSES
W. Ray Taylor.
J. Ellis Glen.
INVENTOR.
HENRY G. REIST.
by Albert G. Davis
ATTY.

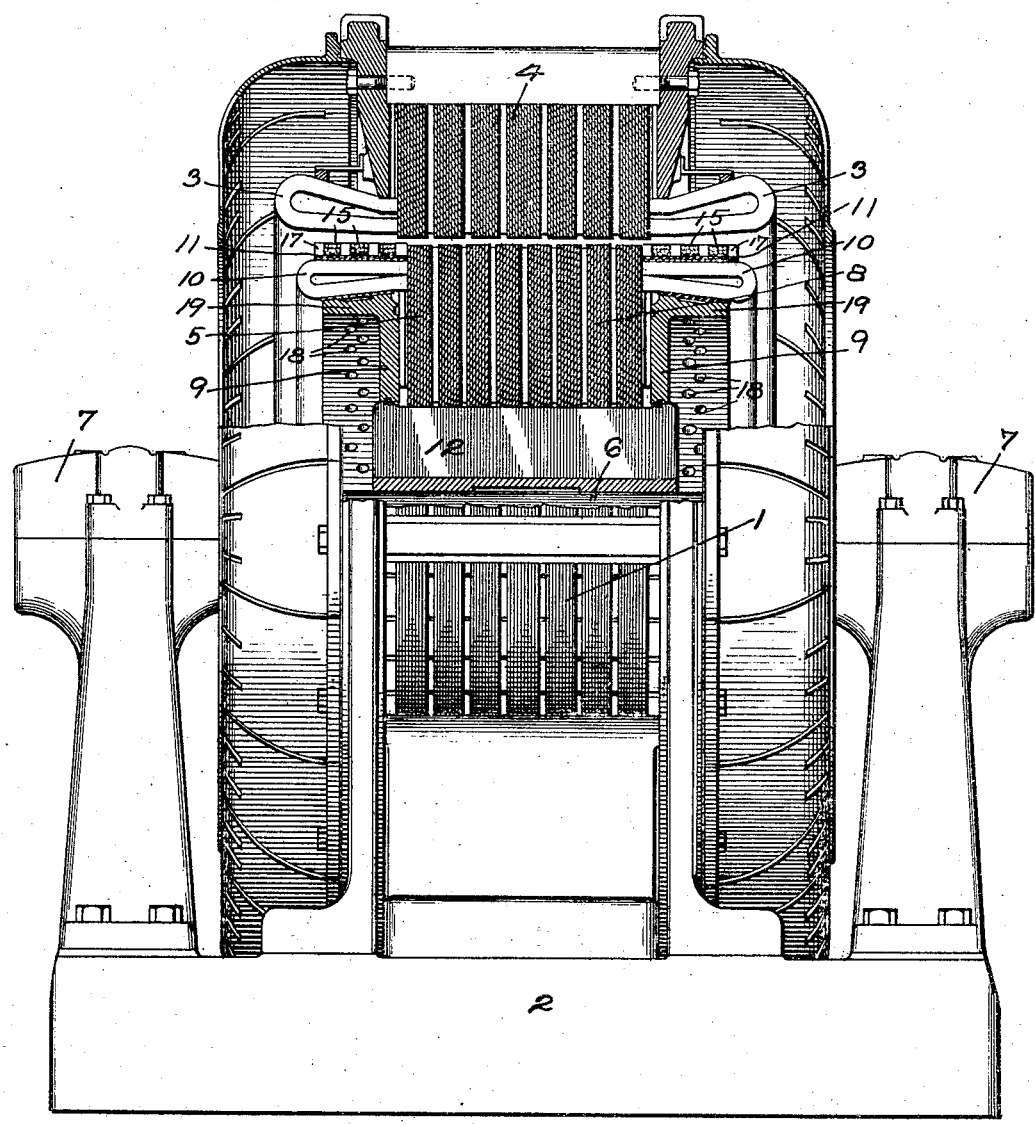

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

No. 894,533.      Specification of Letters Patent.      Patented July 28, 1908.

Application filed November 11, 1907. Serial No. 401,544.

*To all whom it may concern:*

Be it known that I, HENRY G. REIST, a citizen of the United States, residing at Schenectady, in the county of Schenectady and State of New York, have invented certain new and useful Improvements in Dynamo-Electric Machines, of which the following is a specification.

My invention relates to dynamo-electric machines and more particularly to a combined binding band and ventilating means therefor and has for its object to improve the ventilation of such machines.

My binding band, which holds the end conductors or connections of a dynamo-electric machine in place against the action of centrifugal force, has clips extending outwardly from the end conductors. These clips act as fan-blades and stir up the air, especially that about and in the end conductors, and the air thus set in motion also helps to keep the rest of the machine cool.

The various forms of novelty which characterize my invention are pointed out with particularity in the claims annexed to and forming a part of this specification. For a better understanding of my invention, however, and the advantages possessed by it, reference may be had to the following description taken in connection with the accompanying drawing in which Figure 1 is an elevation of an alternating-current generator which embodies my invention and is partly in section showing the interior construction; Fig. 2 is an enlarged view of an end conductor with my binding band in place, and Fig. 3 is a view of a section of my binding band with some of the binding wire in place which holds the band and end conductors against centrifugal force.

I have preferred to illustrate my invention in connection with an alternating current generator, in which the stationary armature 1 is mounted on a base 2. The armature winding 3 is embedded in slots in the laminations 4. The revolving field 5 is mounted on a shaft 6 which is supported in the bearings 7. This field has laminations 8 mounted on a spider 12 and a field winding embedded in slots in the laminations 8. These laminations are clamped between end members 9 in any usual or preferred manner, and the end connections 10 of the field winding rest upon axially extending flanges 19 of these end members and are held in place by the binding band and binding wire. It will be noticed that the laminations of both the armature and field have ventilating ducts which are formed by space blocks inserted between the bundles of laminæ.

Referring now particularly to Figs. 2 and 3, the end conductor or connection 10 rests on a layer of insulation 13 which is placed on the flange 19 of the end member. The binding band 11 also rests on a layer of insulation 14 and is held in position by the layers of binding wire 15. The binding band is made by well-known punch press methods out of a metal strip so as to form holes 16, and outwardly extending clips 17 formed integrally with the strip. These clips are arranged in rows and act as fan-blades when the field revolves. The binding wire 15 is wound between adjacent rows of clips and the spaces 16 are consequently not covered. Holes 18 may also be drilled in the end members and corresponding holes cut in the insulation 13. When such holes are made, holes are also cut in the insulation 14 corresponding with the spaces 16 so that air may be drawn through the end members, pass over the end conductors and out through the spaces 16. The holes in the insulation 13 and 14 cannot be seen in the drawing as the sections shown are not taken through the holes 18 or the spaces 16. In Fig. 3 one layer of the binding wire has been removed so that the construction of the clips 17 is clearly shown.

I have illustrated my invention in connection with an alternating current generator to which it is particularly adapted, but I do not wish to be limited to any particular form of dynamo-electric machine as it is evident to those skilled in the art, that my binding band may be used on any type of machine. It is necessary to use the binding wire 15 on machines of high peripheral velocities, but on slow speed machines the wire may be dispensed with, the ends of the band being suitably fastened together. Further changes may be made in my invention without departing from the spirit thereof, and I do not wish to have my claims limited any more than the state of the art requires.

What I claim as new and desire to secure by Letters Patent of the United States, is,

1. A binding band for a dynamo-electric machine comprising a metal strip having holes therein, and clips formed integrally therewith, said clips acting as fan-blades.

2. A binding band for a dynamo-electric machine comprising a metal strip having holes therein, and rows of clips formed integrally therewith, said clips acting as fan-blades.

3. In a dynamo-electric machine, a revolving member having a binding band, and clips extending outwardly from said band, said clips acting as fan-blades.

4. In a dynamo-electric machine, a revolving member having a binding band, clips extending outwardly from said band, said clips acting as fan-blades, and means for holding said band in place.

5. A binding band for a dynamo-electric machine comprising a metal strip, and clips extending outwardly from said strip, said clips acting as fan-blades.

6. In a dynamo-electric machine, a revolving member having a metal strip about it, and rows of clips extending outwardly from said strip and acting as fan-blades.

7. In a dynamo-electric machine, a revolving member having a metal strip about it, rows of clips extending outwardly from said strip and acting as fan-blades, and binding wire between said rows of clips holding said metal strip in place on said revolving member.

8. A revolving member of a dynamo-electric machine comprising laminations, end members clamping said laminations, a flange on one of said end members, a winding embedded in slots in said laminations and having end connections, and a binding band holding said end connections against said flange, said binding band comprising a metal strip having holes therein and clips extending outwardly from said metal strip.

9. A revolving member of a dynamo-electric machine comprising laminations, end members clamping said laminations, a flange on one of said end members, a winding embedded in slots in said laminations and having end connections, a binding band holding said end connections against said flange, said binding band comprising a metal strip having holes therein, rows of clips extending outwardly from said strip and acting as fan-blades, and binding wire between said rows of clips holding said metal strip in place.

10. A revolving member of a dynamo-electric machine comprising laminations, end members clamping said laminations, a flange on one of said end members, said flange having holes therein, a winding embedded in slots in said laminations and having end connections, and a binding band holding said end connections against said flange, said binding band comprising a metal strip having holes therein, rows of clips extending outwardly from said metal strip and acting as fan-blades, and binding wire between said rows of clips holding said metal strip in place.

In witness whereof, I have hereunto set my hand this 7th day of November, 1907.

HENRY G. REIST.

Witnesses:
BENJAMIN B. HULL,
HELEN ORFORD.